(12) United States Patent
Hagiwara et al.

(10) Patent No.: US 9,321,650 B2
(45) Date of Patent: Apr. 26, 2016

(54) CARBON NANOFIBER, DISPERSION LIQUID AND COMPOSITION THEREOF

(71) Applicant: MITSUBISHI MATERIALS CORPORATION, Tokyo (JP)

(72) Inventors: Masahiro Hagiwara, Akita (JP); Osamu Sakaya, Akita (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/238,578

(22) PCT Filed: Oct. 1, 2012

(86) PCT No.: PCT/JP2012/075344
§ 371 (c)(1),
(2) Date: Feb. 12, 2014

(87) PCT Pub. No.: WO2013/047871
PCT Pub. Date: Apr. 4, 2013

(65) Prior Publication Data
US 2014/0191164 A1 Jul. 10, 2014

(30) Foreign Application Priority Data
Sep. 30, 2011 (JP) ................................. 2011-216215

(51) Int. Cl.
*B82Y 40/00* (2011.01)
*C01B 31/02* (2006.01)
*D06M 11/55* (2006.01)
*D06M 11/64* (2006.01)
*D01F 11/12* (2006.01)
*B82Y 30/00* (2011.01)
*D01F 9/12* (2006.01)
*D06M 101/40* (2006.01)

(52) U.S. Cl.
CPC ............... *C01B 31/022* (2013.01); *B82Y 30/00* (2013.01); *B82Y 40/00* (2013.01); *D01F 9/12* (2013.01); *D01F 11/12* (2013.01); *D01F 11/122* (2013.01); *D06M 11/55* (2013.01); *D06M 11/64* (2013.01); *D06M 2101/40* (2013.01); *Y10S 977/748* (2013.01); *Y10S 977/932* (2013.01); *Y10T 428/249924* (2015.04); *Y10T 428/2918* (2015.01)

(58) Field of Classification Search
CPC ... D06M 11/64; D06M 11/55; D06M 101/40; C01B 31/02; C01B 31/022; D01F 9/127; D01F 9/12

USPC ................ 252/500; 977/952, 748; 423/415.1; 428/367, 292.1
See application file for complete search history.

(56) References Cited

U.S. PATENT DOCUMENTS

2009/0048386 A1    2/2009   Plee
2009/0093554 A1*   4/2009   Zhang et al. .................... 516/98

FOREIGN PATENT DOCUMENTS

| EP | 1117141 A1 | 7/2001 |
|---|---|---|
| EP | 2824069 A1 | 1/2015 |
| JP | 08-012310 A | 1/1996 |
| JP | 2006-282468 A | 10/2006 |
| JP | 2008-517863 A | 5/2008 |
| JP | 2008-251272 A | 10/2008 |
| JP | 2008-270204 A | 11/2008 |
| JP | 2008270204 A * | 11/2008 |
| JP | 2009-029695 A | 2/2009 |
| JP | 2009-289733 A | 12/2009 |
| JP | 2010-024127 A | 2/2010 |
| JP | 2012-131655 A | 7/2012 |
| WO | WO-97/45257 A1 | 12/1997 |
| WO | WO-2006/135439 A2 | 12/2006 |

OTHER PUBLICATIONS

International Search Report dated Nov. 27, 2012, issued for PCT/JP2012/075344.
Extended European Search Report dated Jun. 5, 2015 issued by the European Patent Office in corresponding application No. 12837142.4.

* cited by examiner

*Primary Examiner* — Mark Kopec
*Assistant Examiner* — Danny N Kang
(74) *Attorney, Agent, or Firm* — Locke Lord LLP; James E. Armstrong, IV; Nicholas J. DiCeglie, Jr.

(57) ABSTRACT

The carbon nanofiber has a content of oxygen controlled in a range of 8% by mass to 20% by mass and excellent dispersibility in polar solvents by means of an oxidization treatment carried out on a raw material of the carbon nanofiber. The above-described oxidization treatment is preferably carried out at 100° C. or higher using an mixed acid of nitric acid and sulfuric acid in which the nitric acid concentration is in a range of 10% by mass to 30% by mass. A carbon nanofiber dispersion liquid is obtained by dispersing the above-described carbon nanofiber in a polar solvent, and a carbon nanofiber composition contains the above-described dispersion liquid and a binder component.

9 Claims, No Drawings

CARBON NANOFIBER, DISPERSION LIQUID AND COMPOSITION THEREOF

TECHNICAL FIELD

The present invention relates to a carbon nanofiber having dispersibility improved by controlling the content of oxygen, a dispersion liquid and a composition thereof.

Priority is claimed on Japanese Patent Application No. 2011-216215, filed Sep. 30, 2011, the content of which is incorporated herein by reference.

BACKGROUND ART

A variety of carbon nano-materials, typically, carbon nanotubes have thus far been developed, and are considered to be promising materials with various functions in a variety of usages such as conductive fillers, thermal conduction materials, light-emitting elements, electrode materials for batteries or capacitors, wiring materials, electrode-bonding materials between wires, reinforcing materials, and black pigments.

However, in general, carbon nano-materials form an aggregate immediately after being manufactured, and it is extremely difficult to produce a state in which carbon nano-materials are sufficiently dispersed in a solvent. As a result, there is a problem in that, when made into products, carbon nano-materials do not sufficiently exhibit their characteristics.

In the past, as means of improving the dispersibility of carbon nano-materials, for example, a carbon nano-material having a surface oxidized by adding an oxidant to an acidic suspension of a fine carbon fiber (PTL 1), carbon nano-material into which a COOM group is introduced through wet oxidization using nitric acid or an mixed acid of nitric acid and sulfuric acid (PTL 2), a carbon nano-material into which a nitro group is introduced through an ultrasonic treatment in fuming nitric acid or an mixed acid of fuming nitric acid and concentrated sulfuric acid (PTL 3), and the like are known.

However, in the above-described examples of the related art, there was a problem in that the conductivity deteriorated due to the carbon nanofiber cut by an excessive oxidization treatment or the dispersibility was not sufficient due to an insufficient oxidization treatment, or there as a problem in that, since an organic solvent was used as a dispersion medium during nitration, the dispersibility of the carbon nanofiber was not sufficient at a high concentration.

CITATION LIST

Patent Literature

[PTL 1] Japanese Unexamined Patent Application, First Publication No. 2008-270204

[PTL 2] Japanese Unexamined Patent Application, First Publication No. 2008-251272

[PTL 3] Japanese Unexamined Patent Application, First Publication No. 2010-24127

SUMMARY OF INVENTION

Technical Problem

The invention has solved the above-described problems of the related art, and provides a highly conductive carbon nanofiber having dispersibility, particularly, excellent dispersibility at a high concentration, a dispersion liquid which contains the above-described carbon nanofiber and does not require a dispersant, a paint composition and a paste composition which are manufactured using the above-described dispersion liquid.

Solution to Problem

The invention relates to a carbon nanofiber which solves the above-described problems using configurations described below, the above-described dispersion liquid, a paint composition and a paste composition which contain a carbon nanofiber manufactured using the above-described dispersion liquid.

[1] A carbon nanofiber in which a content of oxygen generated by an oxidization treatment is in a range of 8% by mass to 20% by mass.

[2] The carbon nanofiber according to the above [1] in which the content of oxygen is controlled in a range of 8% by mass to 20% by mass by carrying out the oxidization treatment at 100° C. or higher using an mixed acid of nitric acid and sulfuric acid in which a nitric acid concentration ratio is in a range of 10% by mass to 30% by mass.

[3] A carbon nanofiber dispersion liquid obtained by dispersing the carbon nanofiber according to the above [1] or [2] in one or more dispersion media selected from polar solvents.

[4] A paint composition or a paste composition containing the carbon nanofiber dispersion liquid according to the above [3] and a binder component.

[5] A conductive coated film formed using the paint composition or the paste composition according to the above [4].

Advantageous Effects of Invention

Compared with the related art, the carbon nanofiber of the invention can be uniformly dispersed even at a high concentration, particularly, in an organic solvent. Furthermore, it is possible to easily form conductive coated films having excellent conductivity using a paint composition or a paste composition for which a dispersion liquid of the above-described carbon nanofiber is used.

DESCRIPTION OF EMBODIMENTS

Hereinafter, the invention will be specifically described based on embodiments.

The carbon nanofiber of the invention has a content of oxygen generated by an oxidization treatment in a range of 8% by mass to 20% by mass. Preferably, the carbon nanofiber has a content of oxygen to be controlled in a range of 8% by mass to 20% by mass by carrying out an oxidization treatment on a raw material of the carbon nanofiber at 100° C. or higher using an mixed acid of nitric acid and sulfuric acid in which the nitric acid concentration ratio is in a range of 10% by mass to 30% by mass.

The raw material of the carbon nanofiber used in the invention preferably has a fiber diameter in a range of 1 nm to 100 nm, an aspect ratio of 5 or more, and a spacing of [002] plane in a graphite layer, which is measured using X-ray diffraction, of 0.35 nm or less. Before and after the above-described oxidization treatment, the above-described characteristics do not change. When the carbon nanofiber (raw material of the carbon nanofiber) is dispersed in a solvent, a sufficient number of mutual contact points can be formed between carbon nanofiber strings as long as the fiber diameter and aspect ratio of the carbon nanofiber (raw material of the carbon nanofiber) are in the above-described ranges, and therefore it s possible to obtain a conductive coated film having a high conductivity.

In addition, since the carbon nanofiber having a lamellar spacing of [002] plane in the graphite layer, which is measured using X-ray diffraction, in the above-described range is highly crystalline, the electrical resistance is small, and thus it is possible to obtain highly conductive materials. Furthermore, when the volume resistance value of a compact of the carbon nanofiber is 1.0 Ω·cm or less, the compact exhibits favorable conductivity. In order to further intensify the above-described effects, the fiber diameter of the raw material of the carbon nanofiber is more preferably in a range of 5 nm to 50 nm, the aspect ratio is more preferably in a range of 10 to 1000, and the spacing of [002] plane in the graphite layer, which is measured using X-ray diffraction, is more preferably in a range of 0.337 nm to 0.345 nm, but the above-described characteristics are not limited to the above-described ranges. In addition, the volume resistance value of the compact of the carbon nanofiber is more preferably 0.5 Ω·cm or less, but the volume resistance value is not limited to the above-described range.

The above-described carbon nanofiber can be manufactured using, for example, a vapor-phase epitaxial method in which carbon monoxide is used as a principal raw material gas. The carbon nanofiber manufactured using a vapor-phase epitaxial method has a color transmittance in toluene of approximately 95% or more and is excellent in terms of dispersibility and transparency. The color transmittance in toluene refers to the value of the degree of coloration of toluene extract, which is obtained by extracting a carbon nanofiber using toluene, represented by the transmittance of light rays with a specific wavelength (100% for pure toluene), and is an index to indicate the amount of a non-decomposed organic substance remaining in the carbon nanofiber. The color transmittance in toluene was obtained based on Section 6.2.4 of "Method of Testing Carbon Black for Rubbers" of JIS K 6221-1982. The color transmittance in toluene is more preferably 98% or more from the viewpoint of the balance between manufacturing costs, dispersibility and transparency.

The carbon nanofiber of the invention is a fiber in which the content of oxygen is controlled to be in a range of 8% by mass to 0% by mass by carrying out an oxidization treatment on a carbon nanofiber. Generally, the content of oxygen in the raw material of the carbon nanofiber is in a range of 0.1% by mass to 0.5% by mass immediately after the raw material of the carbon nanofiber is manufactured. When the content of oxygen in the carbon nanofiber that has undergone an oxidization treatment is less than 8% by mass, the carbon nanofiber cannot be dispersed at a high concentration when it is attempted to disperse the carbon nanofiber in a solvent. On the other hand, when the content of oxygen exceeds 20% by mass, the conductivity degrades. The content of oxygen in the carbon nanofiber is more preferably in a range of 8% by mass to 15% by mass from the viewpoint of the balance between dispersibility and conductivity. The content of oxygen can be measured using, for example, an inert gas transportation and fusion infrared absorption method.

In the carbon nanofiber of the invention, in order to control the content of oxygen in a range of 8% by mass to 20% by mass using an oxidization treatment, it is preferable to, for example, carry out wet-oxidization with treatment conditions adjusted to obtain a content of oxygen in a range of 8% by mass to 20% by mass using an mixed acid which is a mixture of nitric acid and sulfuric acid and has a nitric acid concentration ratio in a range of 10% by mass to 30% by mass.

When the mixed acid of nitric acid and sulfuric acid has a nitric acid concentration ratio of larger than 30% by mass, the oxidation treatment becomes excessive, and there is a high probability of the content of oxygen in the carbon nanofiber exceeding 20% by mass. On the other hand, when the nitric acid concentration ratio is lower than 10% by mass, the oxidation treatment becomes insufficient, and there is a high probability of the content of oxygen in the carbon nanofiber becoming smaller than 8% by mass.

Meanwhile, in a case in which the oxidization treatment is carried out on the carbon nanofiber using the mixed acid of nitric acid and sulfuric acid, since the content of oxygen in the carbon nanofiber that has undergone the oxidization treatment is not always proportional to the nitric acid concentration ratio in the mixed acid as described in examples described below, an mixed acid having a nitric acid concentration ratio which can achieve a content of oxygen in a range of 8% by mass to 20% by mass is used depending on the characteristics of the raw material of the carbon nanofiber or the treatment conditions. That is, when nitric acid or sulfuric acid is solely used instead of the mixed acid of nitric acid and sulfuric acid, the content of oxygen in the carbon nanofiber becomes less than 8% by mass in any cases.

The oxidization treatment may be carried out by immersing the raw material of the carbon nanofiber in the mixed acid of nitric acid and sulfuric acid and causing a reaction at a temperature of 100° C. or higher. The liquid temperature is preferably in a range of 100° C. to 200° C., and more preferably in a range of 100° C. to 160° C. At a liquid temperature of lower than 100° C., it is likely that the raw material of the carbon nanofiber may not be sufficiently oxidized, and the content of oxygen in the carbon nanofiber may become less than 8% by mass. When the liquid temperature exceeds 200° C., it is likely that the oxidization treatment may become excessive. A preferable reaction time of the oxidization treatment is, for example, in a range of 30 minutes to 180 minutes, but the rang is not limited. During the oxidization treatment, it is preferable that the mixture be continuously stirred.

In the oxidization treatment, the mass ratio of the mixed acid of nitric acid and sulfuric acid to the raw material of the carbon nanofiber is appropriately in a range of 1 part by mass to 100 parts by mass of the mixed acid to 1 part by mass of the raw material of the carbon nanofiber. The mass ratio is more preferably in a range of 10 parts by mass to 60 parts by mass.

When the oxidization treatment is carried out with the nitric acid concentration ratio of the mixed acid and the treatment conditions adjusted as described above, a carboxyl group, a carbonyl group or the like is introduced into the surface of the carbon nanofiber, and the carbon nanofiber having a content of oxygen controlled in a range of 8% by mass to 20% by mass can be obtained. When an XPS analysis was carried out on the carbon nanofiber that has undergone the oxidization treatment, it was determined that the peak quantitative value of a C—O bond was in a range of 2% to 5%, and oxygen had been introduced by a group having the C—O bond. When the carbon nanofiber having the above-described content of oxygen is dispersed in one or more dispersion media selected from polar solvents such as alcohols, it is possible to obtain a dispersion having excellent dispersibility of the carbon nanofiber.

The carbon nanofiber of the invention can be dispersed in, particularly, polar solvents in an excellent manner, and, for example, in a dispersion liquid dispersed in ethanol, it is possible to increase the amount of the carbon nanofiber to an amount in a range of 0.05 g to 0.10 g per 1 g of the dispersion liquid at a haze of 1.0 or less. The haze refers to the value of, among transmitted light rays that pass the dispersion liquid, transmitted light rays deflected at 2.5° or more from incident light represented by percentage, and the value of the haze decreases as the dispersibility of the carbon nanofiber increases.

When a binder component (resin component) is added to the carbon nanofiber dispersion liquid of the invention, a paint composition or a paste composition can be obtained. In the above-described composition, since the resin component is an insulating component, when the amount of the resin component is large, and the amount of the carbon nanofiber is small, the conductivity of the composition degrades. However, the carbon nanofiber of the invention has favorable dispersibility, and therefore the carbon nanofiber exhibits favorable conductivity at a small content in the composition, and can produce favorable conductive coated films.

A preferable composition of the paint composition or the paste composition is, for example, a composition containing 32% by mass to 94.5% by mass of a polar solve 0.5% by mass to 8% by mass of the carbon nanofiber, and 5% by mass to 60% by mass of the binder component. The composition may contain a non-polar solvent in addition to the polar solvent as necessary, and other necessary components may be added as the paint composition or the paste composition.

Examples of the polar solvent include water, ethanol, IPA, cyclohexanone, methyl ethyl ketone and N-methyl pyrrolidone (NMP). Examples of the binder component include acryl resins, polyester resins, polyimide resins, epoxy resins, and the like, but the binder component is not limited thereto.

EXAMPLES

Hereinafter, examples of the invention will be described together with comparative examples. Meanwhile, the invention is not limited to the examples.

Examples 1 to 6

Oxidization Treatment

A commercially available carbon nanofiber (abbreviated to CNF, manufactured by Mitsubishi Materials Corporation, fiber diameter of 20 nm, aspect ratio of 5 or more) was used as a raw material, a commercially available concentrated nitric acid (concentration of 60% by mass) and a commercially available concentrated sulfuric acid (concentration of 95% by mass) were used, and a surface oxidization treatment was carried out under conditions described in Table 1, thereby obtaining a surface-treated CNF having a controlled content of oxygen. The results of the oxidization treatment are described in Table 1. The content of oxygen was measured using an inert gas transportation and fusion infrared absorption method.

TABLE 1

| | Oxidization treatment conditions | | | | | | CNF |
|---|---|---|---|---|---|---|---|
| | CNF (g) | Nitric acid (g) | Sulfuric acid (g) | Nitric acid concentration ratio in mixed acid (%) | Water (g) | Liquid temperature (°C.) | Content of oxygen (wt %) |
| Example 1 | 20 | 120 | 740 | 14% | 120 | 100 | 18 |
| Example 2 | 40 | 120 | 740 | 14% | 100 | 130 | 20 |
| Example 3 | 60 | 120 | 740 | 14% | 80 | 130 | 8 |
| Example 4 | 20 | 240 | 560 | 30% | 180 | 160 | 12 |
| Example 5 | 10 | 80 | 740 | 10% | 170 | 100 | 15 |
| Example 6 | 40 | 100 | 400 | 20% | 460 | 130 | 10 |
| Comparative Example 1 | 20 | 60 | 690 | 8% | 230 | 100 | 6 |
| Comparative Example 2 | 20 | 260 | 550 | 32% | 170 | 100 | 22 |
| Comparative Example 3 | 20 | 120 | 740 | 14% | 120 | 90 | 5 |
| Comparative Example 4 | 20 | 120 | 0 | 100% | 860 | 100 | 3 |
| Comparative Example 5 | 20 | 0 | 740 | 0% | 240 | 100 | 2 |

(Note)
CNF represents a carbon nanofiber, and
the nitric acid concentration ratio represents (amount of nitric acid)/(amount of nitric acid + amount of sulfuric acid)

As described in Table 1, when the nitric acid concentration ratio in the mixed acid was less than 10%, the oxidization became insufficient, and the content of oxygen in CNF failed to reach 10% by mass (Comparative Example 1). In addition, even when the nitric acid concentration ratio in the mixed acid is slightly larger than 30%, the oxidization became excessive, and the content of oxygen in CNF exceeded 20% by mass (Comparative Example 2). Therefore, it was found that it was preferable to use an mixed acid having a nitric acid concentration ratio in a range of 10% to 30%. Meanwhile, when nitric acid or sulfuric acid is solely used, the content of oxygen in CNF became less than 8% by mass in any cases (Comparative Examples 4 and 5).

In the above-described range of the nitric acid concentration ratio, the content of oxygen in CNF was larger in the case of a nitric acid concentration ratio of 14% (Example 1) than in the case of a nitric acid concentration ratio of 30% (Example 4), and the content of oxygen in CNF was not always proportional to the nitric acid concentration ratio of the mixed acid. However, when the nitric acid concentration ratio of the mixed acid was more than 30%, the content of oxygen in CNF exceeded 20% by mass due to the excessive oxidization treatment, and, on the other hand, when the nitric acid concentration ratio was less than 10%, the content of oxygen in CNF failed to reach 10% by mass due to insufficient oxidization. Therefore, it was determined that the mixed acid having a nitric acid concentration ratio in a range of 10% to 30% was preferable. In the above-described range of the nitric acid concentration ratio, it was determined that, as the treatment conditions which could obtain a content of oxygen in CNF in a range of 8% to 20%, for example, the liquid temperature was appropriately 100° C. or higher, and was preferably in a range of 100° C. to 160° C. In addition, the ratio of the amount of mixed acid to the amount of carbon nanofiber was appropriately in a range of 1 part by mass to 100 parts by mass of the mixed acid to 1 part by mass of CNF.

Examples 1 to 6

Dispersion Liquid and Paint Composition

CNF in Table 1 was dried so as to produce powder, the powder was mixed with ethanol, and an ethanol dispersion liquid was prepared using a beads mill. The contents of CNF in the dispersion liquids are described in Table 2. The dispersion liquid was mixed with an acryl resin solution so that the content of CNF in a dried coated film solid content became 4.5% by mass, thereby preparing a paint composition. The paint composition contained 68.6% by mass of a polar solvent, 1.4% by mass of the carbon nanofiber, and 30% by mass of a binder component. The paint composition was applied to a surface of a 100 μm-thick polyester film using a bar coater so as to obtain an application amount of 0.25 g/m$^2$, and dried at 80° C. for 3 minutes, thereby producing a coated film.

The haze of the CNF dispersion liquid, the surface resistivity of the coated film, and the haze (%) of the coated film were measured. The hazes were measured using a haze meter "HGM-3D" (trade name) manufactured by Suga Test Instruments Co., Ltd. The haze value of the dispersion liquid including the haze of a quartz cell (0.3%) was measured by diluting the dispersion liquid using a dispersion medium (ethanol) so as to obtain a CNF concentration of 40 ppm, and putting the diluted solution into the quartz cell having an optical path length of 3 mm. The measured haze of the coated film included the haze (1.8%) of the polyester film which was a base film. The surface resistivity ($\Omega/\square$: ohm per square) of the coated film was measured using "HIRESTA UP MCD-H450" (trade name) manufactured by Mitsubishi Chemical Corporation and concentric ring probe. The results are described in Table 2.

TABLE 2

| | Dispersion liquid | | Coated film | |
|---|---|---|---|---|
| | Content of CNF (wt %) | Haze (%) | Surface resistivity ($\Omega/\square$) | Haze (%) |
| Example 1 | 8 | 0.4 | 7.5 × 10$^6$ | 2.0 |
| Example 2 | 10 | 0.3 | 3.2 × 10$^6$ | 1.9 |
| Example 3 | 5 | 0.6 | 9.3 × 10$^5$ | 2.2 |
| Example 4 | 5 | 0.5 | 5.6 × 10$^6$ | 2.0 |
| Example 5 | 8 | 0.4 | 2.1 × 10$^6$ | 2.1 |
| Example 6 | 8 | 0.3 | 1.9 × 10$^6$ | 2.0 |
| Comparative Example 1a | 10 | Not dispersed | — | — |
| Comparative Example 1b | 5 | 7.2 | 9.6 × 10$^6$ | 8.9 |
| Comparative Example 2 | 5 | 0.3 | 3.5 × 10$^8$ | 1.9 |
| Comparative Example 3 | 5 | 8.7 | 8.2 × 10$^6$ | 10.4 |
| Comparative Example 4 | 5 | Not dispersed | — | — |
| Comparative Example 5 | 5 | Not dispersed | — | — |

(Note)
The hazes are of dispersion liquids diluted to a CNF concentration of 40 ppm.

As described in Table 2, CNF was not dispersed in the solvent in Comparative Examples 4 and 5 in which the content of oxygen was in a range of 2% by mass to 3% by mass. In addition, since CNF has a small content of oxygen of 6% by mass in Comparative Example 1, when the amount of CNF in the dispersion liquid was large (10 wt % in Comparative Example 1a), CNF was not dispersed, and, when the amount of CNF was 5% by mass, CNF was dispersed, but the hazes of the dispersion liquid and the coated film became high (Comparative Example 1b). In Comparative Example 2 in which the content of oxygen was larger than 20% by mass, CNF exhibited favorable dispersibility in the solvent, but the surface resistivity of the coated film became high. In addition, in Comparative Example 3 in which the content of oxygen was 5% by mass, CNF exhibited poor dispersibility in the solvent, and the haze of the dispersion liquid and the haze of the coated film became significantly high.

On the other hand, in CNF (the content of oxygen was in a range of 8% by mass to 20% by mass) of A1 to A6, the hazes of the dispersion liquids having a concentration of CNF diluted to 40 ppm were 0.6 or less, and the hazes of the coated film having a content of CNF of 4.5% by mass were 2.2 or less, CNF exhibited favorable dispersibility, had a surface resistivity ($\Omega/\square$) of 5.6×10$^6$ or less, and high conductivity.

INDUSTRIAL APPLICABILITY

The carbon nanofiber of the invention can be uniformly dispersed even at a high concentration, particularly, in an organic solvent. Furthermore, it is possible to easily form conductive coated films having excellent conductivity using a paint composition or a paste composition for which a dispersion liquid of the above-described carbon nanofiber is used, and therefore the carbon nanofiber is industrially available.

The invention claimed is:

1. A carbon nanofiber having a content of oxygen generated by an oxidization treatment is in a range of 8% by mass to 20% by mass,
    wherein the content of oxygen is controlled in a range of 8% by mass to 20% by mass by carrying out the oxidization treatment at 100° C. or higher using an mixed acid of nitric acid and sulfuric acid in which a nitric acid concentration ratio is in a range of 10% by mass to 30% by mass, and
    the carbon nanofiber used in the oxidization treatment has 98% or more of a color transmittance in toluene.

2. The carbon nanofiber according to claim 1, wherein a fiber diameter is in a range of 1 nm to 100 nm, an aspect ratio is 5 or more, and a spacing of [002] planes in a graphite layer, which is measured using X-ray diffraction, is 0.35 nm or less.

3. The carbon nanofiber according to claim 1, wherein, when the carbon nanofiber is made into a compact, a volume resistance value of the compact is 1.0 $\Omega$·cm or less.

4. The carbon nanofiber according to claim 2, wherein, when the carbon nanofiber is made into a compact, a volume resistance value of the compact is 1.0 $\Omega$·cm or less.

5. The carbon nanofiber according to claim 1, wherein a fiber diameter is in a range of 5 nm to 50 nm, an aspect ratio of the fiber is in a range of 10 to 1000, a spacing of [002] planes in a graphite layer, which is measured using X-ray diffraction, is in a range of 0.337 nm to 0.345 nm, a volume resistance value of a compact is 0.5 $\Omega$·cm or less when the carbon nanofiber is made into the compact, and a peak quantitative value of a C—O bond is in a range of 2% to 5% when an XPS analysis is carried out on the carbon nanofiber.

6. A carbon nanofiber dispersion liquid obtained by dispersing the carbon nanofiber according to claim 1 in one or more dispersion media selected from polar solvents.

7. A composition comprising:
    the carbon nanofiber dispersion liquid according to claim 6; and a binder component.

8. A composition comprising:
0.5% by mass to 8% by mass of the carbon nanofiber according to claim 1;
32% by mass to 94.5% by mass of a polar solvent; and
5% by mass to 60% by mass of a binder component.

9. A conductive coated film formed using the composition according to claim 7.

* * * * *